(12) United States Patent
Lagerlöf

(10) Patent No.: US 9,782,032 B2
(45) Date of Patent: Oct. 10, 2017

(54) COOKING APPARATUS, A COOKING POT AND A METHOD FOR COOKING

(71) Applicant: BBBL INNOVATION AB, Stockholm (SE)

(72) Inventor: Johan Lagerlöf, Bromma (SE)

(73) Assignee: BBBL Innovation AB, Stockholm (SE)

( * ) Notice: Subject to any disclaimer, the term of this patent is extended or adjusted under 35 U.S.C. 154(b) by 0 days.

(21) Appl. No.: 14/405,275

(22) PCT Filed: Apr. 23, 2013

(86) PCT No.: PCT/SE2013/050434
§ 371 (c)(1),
(2) Date: Dec. 3, 2014

(87) PCT Pub. No.: WO2013/184057
PCT Pub. Date: Dec. 12, 2013

(65) Prior Publication Data
US 2015/0157161 A1 Jun. 11, 2015

(30) Foreign Application Priority Data
Jun. 4, 2012 (SE) ...................................... 1250578

(51) Int. Cl.
*A47J 27/62* (2006.01)
*A47J 37/06* (2006.01)
(Continued)

(52) U.S. Cl.
CPC ............. *A47J 27/62* (2013.01); *A47J 27/004* (2013.01); *A47J 37/1257* (2013.01); *A47J 37/1266* (2013.01); *F24C 7/083* (2013.01)

(58) Field of Classification Search
CPC ...... A47J 27/004; A47J 27/62; A47J 37/1257; A47J 37/1266; A47J 29/02; F24C 7/083; A23L 1/0121
(Continued)

(56) References Cited

U.S. PATENT DOCUMENTS

2005/0072315 A1  4/2005  Romero
2006/0207986 A1  9/2006  Brown
(Continued)

FOREIGN PATENT DOCUMENTS

CN  201239000 Y  5/2009
CN  201239001 Y  5/2009
(Continued)

OTHER PUBLICATIONS

International Search Report and Written Opinion regarding International Application No. PCT/SE2013/050434, dated Oct. 22, 2013, 8 pages.
(Continued)

*Primary Examiner* — Dana Ross
*Assistant Examiner* — Lindsey C Staubach
(74) *Attorney, Agent, or Firm* — Foley & Lardner LLP

(57) ABSTRACT

The invention relates to a cooking apparatus for simultaneous cooking of a plurality of food items. The apparatus has a control unit (1) with a conductor (7) arranged to be connected to an electric energy supply and has switching means 10. According to the invention the control unit (1) is provided with a plurality of electrical connection means (2a, 2b, 2c, 2d). Each connection means (2a, 2b, 2c, 2d) is arranged to be connectable to a cooking pot (4a, 4b, 4c, 4d) for supply of electric energy to a respective cooking pot (4a, 4b, 4c, 4d). The control unit (1) is arranged to allow simultaneous supply of electric energy through the plurality of 1 connection means (2a, 2b, 2c, 2d). The invention also
(Continued)

relates to a cooking pot (4a, 4b, 4c, 4d) with heating means (3a, 3b, 3c) to supply heat to a food item (5a, 5b, 5c, 5d). The cooking pot (4a, 4b, 4c, 4d) has an electric connection unit (9a, 9b, 9c, 9d). The connection unit (9a, 9b, 9c, 9d) is arranged to be connected to either one of a plurality of connection means (2a, 2b, 2c, 2d) of a control unit (1). The invention also relates to a corresponding method for cooking.

20 Claims, 2 Drawing Sheets

(51) Int. Cl.
    *A47J 37/07*     (2006.01)
    *F24C 7/08*     (2006.01)
    *A47J 27/00*     (2006.01)
    *A47J 37/12*     (2006.01)

(58) Field of Classification Search
    USPC ....... 99/325–329 R, 331–333, 448, 339–340
    See application file for complete search history.

(56) References Cited

U.S. PATENT DOCUMENTS

| | | | | |
|---|---|---|---|---|
| 2008/0314258 A1* | 12/2008 | Martin | .................. | A23L 1/0121 99/329 R |
| 2009/0084273 A1* | 4/2009 | Lackman | ............ | A47J 37/1266 99/408 |
| 2010/0326289 A9* | 12/2010 | Theodos | ............. | A47J 37/1266 99/408 |
| 2013/0101714 A1* | 4/2013 | Buehler | .................. | A47J 44/00 426/416 |

FOREIGN PATENT DOCUMENTS

| | | |
|---|---|---|
| CN | 201239002 Y | 5/2009 |
| CN | 201239003 Y | 5/2009 |
| CN | 201239004 Y | 5/2009 |
| CN | 201239005 Y | 5/2009 |
| CN | 201239006 Y | 5/2009 |
| CN | 201239007 Y | 5/2009 |
| CN | 201239008 Y | 5/2009 |
| CN | 201239009 Y | 5/2009 |
| CN | 201641593 | 11/2010 |
| CN | 201683715 | 12/2010 |
| DE | 2002 2823 U1 | 6/2000 |
| DE | 20022823 U1 | 5/2002 |
| EP | 0780081 A1 | 6/1997 |
| EP | 1 785 073 | 5/2007 |
| GB | 662866 | 3/1949 |
| GB | 662866 A | 12/1951 |
| JP | 07-135932 | 5/1995 |
| JP | 2001-008822 | 1/2001 |
| JP | 2002-134209 A | 5/2002 |
| JP | 10-0994375 | 11/2010 |
| JP | 3164570 U | 11/2010 |
| KR | 10-2008-0072731 | 8/2008 |
| KR | 10-0994375 | 11/2010 |
| NL | 1027860 C1 | 6/2006 |
| WO | WO 2007/072581 | 6/2007 |
| WO | WO 2012-075841 | 6/2012 |
| WO | WO 2013/064349 A1 | 5/2013 |
| WO | WO 2014/110646 | 7/2014 |
| WO | WO 2014/110646 A1 | 7/2014 |

OTHER PUBLICATIONS

Supplemental European Search Report regarding corresponding European Appl. No. 13800737.2, dated May 15, 2015, 3 pps.
European Office Action regarding corresponding EP Application No. 13800737.2, dated Jul. 17, 2015, 5 pages.
Japanese Office Action regarding corresponding Japanese Application No. 2015-514954, dated Jul. 9, 2015, 5 pages.
Korean Office Action regarding corresponding Korean Application No. 10-2014-7036428, dated May 11, 2015, 10 pages.
Translation of official notice of rejection regarding corresponding Korean Application No. 10-2014-7036428 dated May 24, 2017, 5 pps.

* cited by examiner

COOKING APPARATUS, A COOKING POT AND A METHOD FOR COOKING

CROSS-REFERENCE TO RELATED APPLICATIONS

The present Application is a U.S. national stage of and claims priority to and the benefit of International Application No. PCT/SE2013/050434, filed on Apr. 23, 2013, which claims priority to Swedish Application No. 1250578-0, filed on Jun. 4, 2012. Both applications are incorporated herein by reference in their entireties.

FIELD OF INVENTION

The present invention in a first aspect relates to a cooking apparatus for simultaneous cooking of a plurality of food items and including a control unit with conductor means arranged to be connected to an electric energy supply.

In a second aspect the invention relates to a cooking pot including electrical heating means arranged to supply heat to a food item in the cooking pot, which cooking pot is provided with an electrical connection unit arranged to be connected to a control unit of a cooking apparatus.

In a third aspect the invention relates to a method for simultaneously cooking a plurality of food items by providing a control unit and connecting the control unit to an electric supply.

With food item is in the present application understood the food-stuff as such, e.g. floating, semi-floating and solid foodstuff such as soup, coffee, sauce, porridge, meat etc. as well as water containing solid food-stuff such as meat, egg, rice, pasta, vegetables etc.

BACKGROUND OF INVENTION

When preparing a meal there is normally a need to cook a plurality of ingredients. Traditionally this can be made simultaneously by putting different cooking pots on different heat sources such as stove plates. This is time consuming, and the efficiency of the supplied energy is low due to the indirect cooking. It is also hard to match the timing of the cooking of the various ingredients in a meal.

Simultaneous cooking of various food items in one single apparatus is generally known. Examples of this are disclosed in CN 201683715, EP 1785073 and US 2005072315. The devices in these disclosures all have an aggregated cooking pot with heating means that is common for the different compartments or sub-pots of the aggregated cooking pot. Thereby individual cooking procedures cannot be made for the food in the compartments.

Further examples of simultaneous cooking of various food items are disclosed in CN 201641593 and CN 20123900. The device of CN 201641593 is an electrical cooker with a multiple inner chambers, and at the bottom of each chamber there is an electric heating device. Each heating device is controlled by a switch and a timing device.

CN 201683715 discloses an outer pot in which an inner pot is housed. The inner pot is divided into two or more sub-pots. The outer pot has a plurality of heating coils with independent control circuits for individually heating the content in the sub-pots.

These known devices for simultaneous and individual cooking suffer from the drawback that they lack flexibility in use, since a complete cooking aggregate has to be used independent of the number of cooking items and since the design of the chambers/sub-pots are fixed. These devices therefore are not suitable for various cooking situations.

SUMMARY OF INVENTION

The object of the present invention is to overcome the problems related to prior art.

This object is according to the first aspect of the invention achieved in that a cooking apparatus of the kind mentioned in the introduction to the description includes the specific features that the control unit is provided with a plurality of electrical connection means, each connection means being arranged to be connectable to a cooking pot for supply of electric energy to a respective cooking pot, and that the control unit is arranged to allow simultaneous supply of electric energy through said plurality of connection means, and in that the control unit is arranged to govern switching means related to each connection means.

The control unit may be one single component. Alternatively the control unit may consist of a plurality of sub-units connected together to form a control unit, in which case each sub-unit is connected to a respective cooking pot and each unit may have a separate power supply connection.

The switching means may advantageously be provided in the control unit and form a component thereof. Alternatively switching means may be provided in each electrical connection means or be related to each cooking pot.

The invented cooking apparatus allows a very energy-efficient cooking since the electric energy is delivered directly to the cooking pots to which the control unit is connectable. The plurality of connection means further allows that cooking in the different cooking pots can be made simultaneously which results in a short cooking time for providing a meal with various ingredients. Since the cooking takes place in cooking pots separated from the cooking apparatus, the use of the cooking apparatus is very flexible. The cooking apparatus as such has no cooking chambers or the like that entails restrictions regarding the number, sizes and character of the spaces in which the different food items are prepared. The number of cooking pots that is connected to the cooking apparatus thus can be selected in dependence of what actually is required for a certain cooking. Each cooking pot that is to be connected to the cooking apparatus can be selected according to the needs of the food item that is to be prepared therein with respect to volume, proportions and design and with respect to kind of cooking, e.g. boiling or frying. This flexibility also contributes further to the energy-efficient operation since over-dimensioned or in other respects non-optimal pots for the various food items can be avoided.

The invented cooking apparatus thereby has many advantages over a conventional stove for cooking. The energy consumption will be much lower, typically in the range of 40 to 50% lower, due to the direct heating. The cooking time will be reduced with up to 75% in comparison with conventional cooking. A much lower amount of fat when frying is required. The apparatus is also particularly children safe since there are no open exposed heat sources. Through the apparatus further a high degree of automation can be achieved and also a better control of the cooking process than through a conventional stove is achieved.

According to a preferred embodiment of the invented cooking apparatus, the switching means includes an ON/OFF-switch for at least one of the connection means.

Thereby the supply of energy to the cooking pot in question can be controlled in a very simple way. It eliminates the need to connect/disconnect the cooking pot for that purpose or to provide the cooking pot with a corresponding switch. Preferably the switching means in the cooking apparatus includes an individual ON/OFF-switch for each of the connection means.

According to a further preferred embodiment, the switching means includes regulating means for regulating the power level of the energy supplied through at least one of the connection means.

Thereby a specific cooking program can be applied to the cooking pot in question, e.g. reducing the power level when a certain temperature has been reached or after a certain time. To provide this functionality present in the cooking apparatus further has similar advantages as those described above for the ON/OFF-switch. Also for this embodiment it is preferred that the power level regulating means of the cooking apparatus is arranged for regulation of the energy supplied through each connection means.

According to a further preferred embodiment, the switching means includes individual switching means for each connection means.

Thereby the cooking process in the respective cooking pot can be regulated separately regarding ON/OFF regulation and/or power regulation. Since the cooking process required in the respective pot normally will be different from each other this regulation possibility meets this need. The cooking processes thus can be individually optimized and a suitable timing can be attained. The individual switching means may operate completely independently of each other. Alternatively a dependency functionality can be present. For example one of the individual switching means can be arranged to operate in response to another of the individual switching means with respect to timing or some other parameter.

According to a further preferred embodiment, the control unit includes information receiving means, and at least one of the connection means includes information transmission means arranged to transmit information to the information receiving means.

Thereby the control unit can receive feedback from the cooking pot connected to that connection means. Such feedback information might be useful for updating the operation of the switching means. The information may be the temperature of the food item. The information can for example be presented on a display on the control unit and/or trigger a sound or light signal in the control unit. Adjusting the operation may be done manually or automatically. Preferably all the connection means include such information transmission means.

According to a further preferred embodiment, the switching means is arranged to operate in response to information received by the information receiving means through the information transmission means.

Thereby an automatic operation of the cooking process can be achieved, in particular when all connection means have an information transmission means and an individual switching means. This reduces the need for manual interference during the cooking.

According to a further preferred embodiment, each connection means includes a flexible cord.

Thereby the flexibility of the operation of the cooking apparatus is further increased in that the location of the cooking pots can be freely chosen within the lengths of the cords and thus facilitate the handling of the cooking process. It will also eliminate the need to provide the cooking pots with cords, which would be less convenient.

According to a further preferred embodiment, the control unit includes a program control means allowing the pre-setting of a certain program for the energy supply to at least one of the connection means, which program defines a power level and a time duration of a cooking period.

This programming of the control unit further reduces the need for manual supervision of the cooking process. The program may be processed by a microprocessor arranged in the control unit or docked thereto for providing commands to the switching means according to the program that is pre-set. The input for setting the preset may be of various kinds, e.g. a manually operated control panel or a reader reading e.g. an EAN-code or a chip of a smart card. The control unit thus may be provided with such a control panel or a reader, respectively. The microprocessor may be provided with storing means for storing a library of programs, whereby the input merely needs to be a certain number, identifying a certain program in the library. The input in that case may also include a code representing the size of the cooking pot connected to the connection means and/or the amount of the food item therein such that a stored program can be adapted thereto. Of course the input may include time-related information, stipulating the starting time, the end time or similar. The control unit may have an interactive display that can display set orders, feedback information from the cooking pots, etc and through which the stored programs can be searchable. Preferably the program control means is such that it allows the described control of each connection means.

The stored programs may also include various additional information, such as manually readable text and/or figures that can be shown on the display of the control unit. The stored programs may also include the selection of a certain cooking pot for a certain food item and instructions regarding what kind of food and how much that is to be put into the respective cooking pots.

It is also possible to have a feedback function for amending a stored program upon result from an actual cooking process performed. This can be done either automatically or by input through the control panel.

According to a further preferred embodiment the certain program includes a sequence of a plurality of such periods, each period being individually pre-set with regards to power level and time duration.

Thereby a complete cooking process can be tailored for the cooking of the food item in the pot concerned in a simple and flexible way.

According to a further preferred embodiment, the control means is arranged to allow an individual pre-setting for each connection means independently of each other.

This embodiment represents an ultimate possibility to adapt the cooking process in the respective pot to what is individually required and to synchronize these processes to each other such that the starting moments and end moments are selected to have the complete meal ready at a certain time.

According to a further preferred embodiment, the certain switching program for the connection means to a cooking pot is adjustable in response to information received to the information receiving means.

With this embodiment the advantages of using the feedback information from the cooking pots and the advantages of applying a certain program for the cooking process are combined. Thereby the cooking can be optimized with respect to minimizing the need for manual operation, maximizing the precision and in a simple way have a high degree of flexibility.

According to the second aspect of the invention, the object of the invention is achieved in that a cooking pot of the kind mentioned in the introduction of the description includes the specific feature that the connection unit is arranged to be connected to either one of a plurality of connection means of the control unit.

The invented cooking pot thus is adapted to be used together with a control unit according to the present invention. A plurality of such cooking pots can simultaneously be connected to the control unit for cooking various food items of a meal that is to be cooked. A cooking pot according to the invention therefore contributes to achieving the benefits of the inventive concept.

According to a preferred embodiment of the invented cooking pot, it includes sensing means sensing at least one parameter related to the food item, and information delivery means arranged to deliver information of the sensed parameter to the control unit.

This embodiment of the cooking pot allows to provide feedback information to the control unit to affect the switching thereof in adaption to the conditions in the cooking pot.

According to a further preferred embodiment, the sensing means includes a temperature sensor in direct contact with the food item.

The temperature normally is the most informative parameter regarding the status of the food item, and therefore provides the most valuable information. The direct contact with the food item results in a very accurate and relevant measured value.

According to a further preferred embodiment the information transmission means is integrated with the connection unit.

This leads to a simple construction. By using a common unit for delivering electric energy in one direction and delivering feedback information in the other direction, the need for specific components for the latter purpose is eliminated.

According to a further preferred embodiment, the heating means includes a plate-shaped unit located inside the pot and in direct contact with the food item.

Such a shape of the heating means will facilitate cleaning of the cooking pot after cooking. The direct contact with the food item minimizes energy losses resulting in rapid heating a high efficiency. The plate-shaped unit is preferably flat such that cleaning is further facilitated. The plate-shaped unit may alternatively be wave-shaped e.g. for frying. Preferably the plate-shape unit may be located in a horizontal plane, and preferably extend over a major part of the cross sectional area of the cooking part. A large extension of the plate-shaped unit means that the heat transfer to the food item is distributed over a large area resulting in a homogeneous heating.

According to a further preferred embodiment, the connection unit includes a connection control means having reading means arranged to read information related to the connection means to which the connection unit is connected, and having connection accept means arranged to allow energy supply only when said information meets a matching criterion and prevent energy supply if that matching criterion is not met. Alternatively the connection control means is provided with indication means that can be read by the connection means to which the connection unit is connected for the purpose of executing a corresponding accept/non-accept function in the connection means or in the control unit.

Thereby an important safety function will be present such that the cooking pot cannot be operated when connected to a cooking apparatus for which it is not intended. A connection to a wrong kind of cooking apparatus would entail the risk of overheating and fire or fault operation in other respects. To use a cooking pot according to this embodiment requires that the cooking apparatus to which it is to be connected has some kind of indication at the termination of each of its connection means or some kind of reading means, respectively. The indication may be mechanical, magnetic, a chip etc, whereby the connection unit is arranged to mechanically, magnetically or electronically, respectively read the presence or non-presence of that indication device.

According to a further preferred embodiment, the cooking pot is provided with switching means arranged to be governed by the control unit of the cooking apparatus.

Thereby the cooking apparatus to which the cooking pot is to be connected not necessarily has be provided with switching means.

The invention also relates to a cooking device including a cooking apparatus according to the invention and a plurality of cooking pots according to the invention, such that each connection means of the cooking apparatus is connectable to the connection means of each cooking pot.

The cooking device thus is a set of components that are able to cooperate with another in a cooking process having considerable advantages in relation to conventional cooking, which advantages are evident from what has been described above.

According to preferred embodiments of the cooking device, the cooking apparatus thereof is according to any of the preferred embodiments of the invented cooking apparatus.

According to further preferred embodiments of the cooking device, each cooking pot thereof is according to any of the preferred embodiments of the invented cooking pot.

The preferred embodiments of the cooking device have corresponding advantages as those of the preferred embodiments of the invented cooking apparatus and the invented cooking pot, respectively, which advantages have been described above.

In a third aspect of the invention, the object thereof is achieved in that a method for cooking of the kind mentioned in the introduction of the description includes the specific steps of providing a plurality of cooking pots, each cooking pot having heating means, electrically connecting the control unit to each cooking pot for delivering electric energy thereto, providing switching means governing the delivery of electric energy, which switching device is governed by the control unit.

heating the food item in each cooking pot by electrically heating its heating means.

According to preferred embodiments, the method is performed by using a cooking device according to the present invention, in particular to any of the preferred embodiments thereof.

The invented method and the preferred embodiments thereof have advantages similar to those of the invented cooking device and its preferred embodiments, which advantages have been described above.

The above described preferred embodiments of the invention are specified in the dependent claims. It is to be understood that further preferred embodiments of course can be constituted by any possible combination of the preferred embodiments above and by any possible combination of these and features mentioned in the description of examples below.

The invention will be further explained through the following detailed description of examples thereof and with reference to the accompanying drawings.

SHORT DESCRIPTION OF THE DRAWINGS

DESCRIPTION OF EXAMPLES

Figure 1:
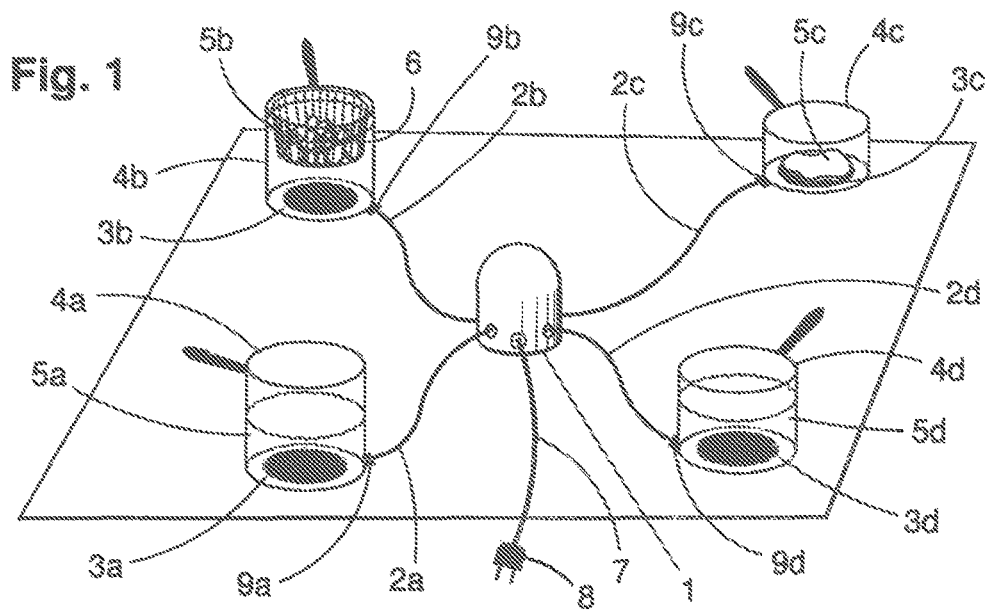
FIG. 1 is a schematic representation in a perspective view of a cooking device according to the invention.

The cooking device illustrated in FIG. 1 is shown on a table. It might be any table, plate or board in a kitchen or somewhere else. In order to harmonize with conventional cooking and kitchen design the plate may be located on top of a stove-like unit, having an oven but no other cooking facilities on the top.

The cooking device consists of a cooking apparatus and a plurality, in this example four, cooking pots 4a, 4b, 4c, 4d. The cooking device has a control unit 1, a cord 7 with a plug 8 for connection to a wall socket. It further has a connection means 2a, 2b, 2c, 2d connecting the control unit 1 to each of the cooking pots 4a, 4b, 4c, 4d, where each connection means in this example is a cord 2a, 2b, 2c, 2d.

Each cooking pot 4a, 4b, 4c, 4d has a respective heating means 3a, 3b, 3c, 3d for heating a respective food item 5a, 5b, 5c. Each heating means 3a, 3b, 3c, 3d has a plug 9a, 9b, 9c, 9d establishing a connection unit 9a, 9b, 9c, 9d that is connectable to a respective socket at the ends of the cords 2a, 2b, 2c, 2d.

Alternatively, the connection unit of each cooking pot may include a cord. In that case each connection means of the cooking apparatus may merely consist of a socket attached to the control unit.

All the cooking pots may be similar to each other. However, for illustrative purposes the figure depicts different kinds of cooking pots. The cooking pots 5a and 5d are merely pots containing a liquid food stuff, e.g. soup or sauce and the respective heating means 3a, 3d is in direct contact therewith.

The cooking pot 4b contains water and a food stuff 5b such as potatoes located in a metal basket 6 inside the pot and immersed in the water. The heating element 3b heats the water by direct contact therewith and thereby cooks the food stuff.

The food item 5c in the cooking pot 4c is a piece of meat resting on the heating means 3c to be fried thereon.

It is to be understood that other types of cooking pots may be used in the cooking device. The cooking pots may be made of transparent material such as glass or by non-transparent material such as steel. They may be open or have a cover, may be rectangular or circular, etc.

The cooking processes in the different pots 4a, 4b, 4c, 4d are individually governed by the control unit 1 and may occur simultaneously, partly simultaneously or in sequence in dependence of the need. The control unit 1 and thereby the supply of electric heating to the cooking pots 4a, 4b, 4c, 4d can be manually, semi-manually or automatically operated.

Figure 2:
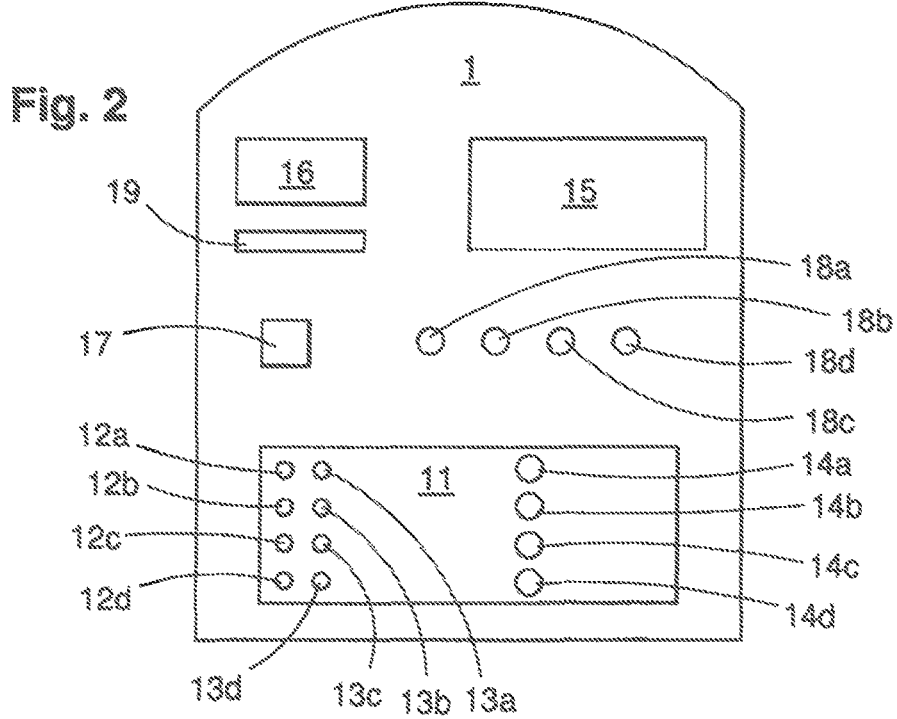
FIG. 2 is a simplified side view of a control unit in a cooking device according to the invention.
Figure 3:
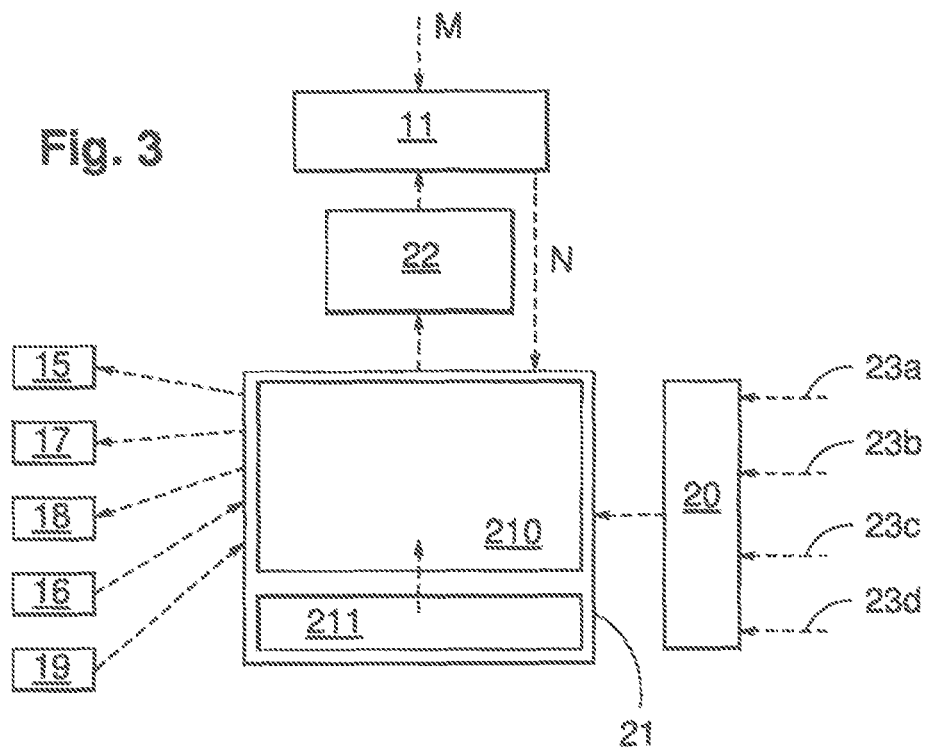
FIG. 3 is a diagram illustrating the cooperation of components of the control unit in FIG. 2.

FIGS. 2 and 3 more in detail describes the operation of the control unit 1. The control unit has switching means 11 with individual switches for each connection means. Thus there are four pairs of ON/OFF switches 12a, 13a, 12b, 13b, 12c, 13c, 12d, 13d, each pair related to a respective connection means 2a, 2b, 2c, 2d. There are also four regulating means 14a, 14b, 14c, 14d through which the power level of energy supply to the respective connection means 2a, 2b, 2c, 2d can be regulated. The figure is intended to describe the functionality of the control unit rather than illustrating how the switches are arranged. It is thus to be understood that in practice the ON/OFF switches may be one single button or be an integral part of the regulating means 14a, 14b, 14c, 14d such that OFF-function is achieved by turning the regulating means to zero level. The switching means is illustrated as having manually operated switches. This can be the case in simple realisations of the invention. As will be understood further on, the operation of the switches may be fully automatic making manually operated switches redundant. Alternatively the switching functions can be performed by a combination of manual and automatic commands or by selecting either of these modes. The presence of manually operated switches as illustrated in the figure thus is optional in dependence of the sophistication degree of the cooking apparatus.

The illustrated control unit 1 also has a display 15 on which various information relating to the individual cooking processes can be shown, such as actual temperature, desired end temperature, starting time, finishing time, power level etc can be shown. Further there is a keyboard 16 on which manual commands can be made, e.g. changing the cooking program for a certain cooking pot in response to information on the display or due to other reasons. Of course the display may be a touch screen such that a separate keyboard is superfluous.

A speaker 17 is arranged to provide sound signals from the cooking pots according to certain criteria such as time or temperature related. Signal lamps 18a, 18b, 18c, 18d are arranged to provide corresponding visual information.

The control unit 1 also has a slot 19 for receiving and reading a smart card for providing input to the cooking process. Such a smart card may have control orders for a certain complete meal and thus govern the switching and power supply to the different cooking pots. The smart card thus functions as a "recipe" that may be chosen from a collection of such cards. Of course other media for providing control information to the control unit may be applied.

As evident from the above the control unit of the cooking apparatus may include only a few of the inputs mentioned above and none or just one of the output indicators. On the other hand it might include all of the devices described above. The control unit thus can be realized at various degrees of sophistication from a pure manual one to a complete automatic unit. For a control unit having manual as well as various automatic settings of the program the unit may have a mode selector for choosing the desired alternative. As also should be evident, a combination of automatic and manual and/or feedback-related control also can be possible allowing interference in a pre-set program manually or in response to feedback information.

FIG. 3 in a diagram represents the logics of the control unit described above. Also FIG. 3 illustrates a control unit with a high degree of functionality and it is to be understood that parts thereof may be omitted for more simple applications. The core part is the switching means 11 having ON/OFF-switches and/or power level regulators for the different cooking pots connected to the control unit. The switching means is actuated either by the program control means 22 or manually or combined. In case the switching means is arranged to be solely operated by the program control means 22 external buttons or the like as shown in FIG. 2 may be omitted.

The program control means 22 receives signals from a microprocessor 21 for executing the switching, A processing unit 210 of the microprocessor 21 receives input information from various sources, of which some may be optional. One input source is the information receiving means 20, receiving status information e.g. temperature from each of the cooking pots 4a, 4b, 4c, 4d connected to the control unit via a respective information transmitting means 23a, 23b, 23c, 23d. Another input source may be the keyboard 16 on the control unit 1. A further one may be the reader in the smart card slot 19. The microprocessor 21 may also have a storage unit 211 for the storage of various switching programs forming a recipe library. The library may be pre-installed, and the storage unit 211 may be arranged to be up-dated by downloading further programs.

In application allowing also manual switching through buttons, the microprocessor 21 also receives information of the switching status as illustrated by the arrow N.

The information received to the microprocessor 21 is processed in its processing unit 210 to provide the required commands to the program control means 22. The microprocessor 21 also provides output information to the display 15, to the speaker 17 and to the signal lamps 18, to the extent these functions are present.

Figure 4:
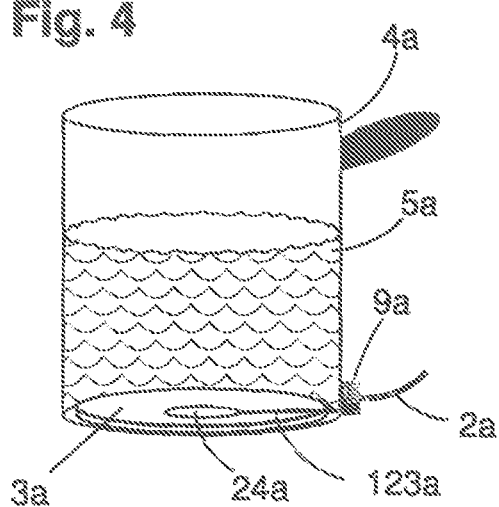
FIG. 4 is a schematic representation in a perspective view of a cooking pot according to the invention.

FIG. 4 illustrates the cooking pot 4a in FIG. 1. The heating element 3a has a temperature sensor 24a sensing the temperature of the food item in the cooking pot. By an information delivery means 123a connected to the connection unit 9a information of the sensed temperature is transmitted to the microprocessor 21 of the control unit via the information transmission means 23a in the connection means 2a. In this example the temperature sensor is illustrated as integrated with the heating unit 3a. Alternatively the temperature sensor may be located somewhere else in the cooking pot. A plurality of temperature sensors may be provided. Other kinds of sensors might also be present such as viscosity sensor or a smoke detector.

A cooking pot according to the invention may be made from any suitable material, e.g. glass or stainless steel and may include a lid.

The heating unit 3a is illustrated to be located on the bottom of the pot, but it is to be understood that it alternatively can be arranged higher up in the pot.

Figure 5:
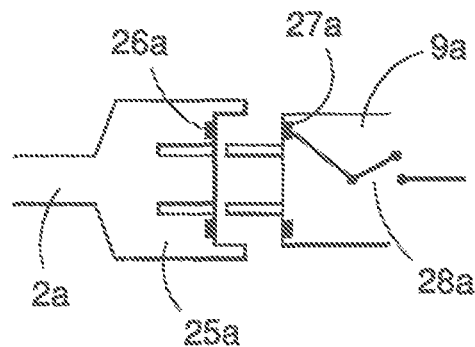
FIG. 5 illustrates a detail of an embodiment of the invention.

FIG. 5 illustrates the connection of the connection means 2a of the cooking apparatus to the connection unit 9a of a cooking pot according to one embodiment of the invention. The connection means 2a from the control unit 1 terminates as a socket 25a. The connection means 9a is a matching plug. The socket 25a has a small magnet 26a embedded in its bottom wall. The connection unit 9a at is front side has a small piece 27a of magnetisable metal located to match the position of the magnet 26a at connection. The metal piece 27a will thus be affected when coming into close proximity to the magnet 26a and thereby read whether such a magnet 26a is present or not. In case a magnet is present the affection of the metal piece 27a will provide an accept-signal to close a switch 28a in the connection unit 9a to allow energy supply to the cooking pot related thereto. If the connection unit 9a is connected to a socket 25a without the magnet 26a the switch 28a remains open. The magnet 26a may be replaced with some other kind of indication means that can be read mechanically, optically or electronically.

In an alternative embodiment (not illustrated), the arrangement can be mirrored such that the indication means, e.g. the magnet is arranged in the control unit 9a and the reading means as well as the switch is located in the connection means 2a of the control unit 1.

The invention claimed is:

1. A cooking apparatus for simultaneous cooking of a plurality of food items to be prepared in one or more freestanding cooking pots, the cooking apparatus including: a control unit with conductor means arranged to be connected to an electrical energy supply, wherein the control unit is provided with a plurality of electrical connection means, each electrical connection means being arranged to be interchangeably connectable to any one or more of the one or more cooking pots for supply of electric energy to a respective cooking pot, and in that the control unit is arranged to allow simultaneous supply of electric energy through said plurality of electrical connection means, and in that the control unit is arranged to govern switching means related to each electrical connection means, wherein the control unit is a separate component centrally arranged relative to each of the one or more cooking pots, and wherein the control unit is electrically disposed between the one or more cooking pots and the electrical energy supply, such that electric energy flows from the electrical energy supply to the control unit and selectively to each of the electrically connected one or more cooking pots.

2. The cooking apparatus according to claim 1, wherein the switching means includes an ON/OFF-switch for at least one of said electrical connection means.

3. The cooking apparatus according to claim 1, wherein the switching means includes regulating means for regulating the power level of the energy supplied through at least one of said electrical connection means.

4. The cooking apparatus according to claim 2, wherein the switching means includes individual switching means for each electrical connection means.

5. The cooking apparatus according to claim 1, wherein the control unit includes information receiving means and in that at least one of said electrical connection means includes information transmission means arranged to transmit information to said information receiving means.

6. The cooking apparatus according to claim 5, wherein the switching means is arranged to operate in response to information received by said information receiving means through said information transmission means.

7. The cooking apparatus according to claim 1, wherein each electrical connection means includes a flexible cord.

8. The cooking apparatus according to claim 1, wherein the control unit includes a program control means allowing the pre-setting of a certain program for the energy supply to at least one of said electrical connection means, said certain program defining a power level and a time duration of a cooking period.

9. The cooking apparatus according to claim 8, wherein said certain program includes a sequence of a plurality of said periods, each period being individually pre-set with regards to power level and time duration.

10. The cooking apparatus according to claim 8, wherein the control means is arranged to allow an individual pre-setting for each electrical connection means independently of each other.

11. The cooking apparatus according to claim 8, wherein said certain program is arranged to be adjustable in response to said received information.

12. A cooking pot including: electrical heating means arranged to supply heat to an item in the cooking pot, the cooking pot provided with an electrical connection unit arranged to be interchangeably connected to a freestanding control unit of a cooking apparatus for simultaneous cooking of a plurality of food items to be prepared in the cooking pot, wherein the connection unit is arranged to be connectable to any one of a plurality of electrical connection means of said control unit, each one of the plurality of electrical connection means is arranged to be connectable to the cooking pot for supplying electric energy to the cooking pot, the control unit is arranged to allow simultaneous supply of electric energy through the plurality of electrical connection means, the control unit is arranged to govern switching means related to each electrical connection means, and the control unit is arranged separately from the cooking pot, wherein the control unit is electrically disposed between the cooking pot and an electrical energy supply, such that electric energy flows from the electrical energy supply to the control unit and selectively to the electrically connected cooking pot, and wherein the cooking pot is only connected to the control unit though the electrical connection means.

13. The cooking pot according to claim 12, wherein the cooking pot includes a sensing means for sensing at least one parameter related to the plurality of food items, and an information delivery means arranged to deliver information of the sensed at least one parameter to the control unit.

14. The cooking pot according to claim 13, wherein the sensing means includes a temperature sensor in direct contact with at least one of the plurality of food items.

15. The cooking pot according to claim 13, wherein the information delivery means is partly integrated with the connection unit.

16. The cooking pot according to claim 12, wherein the heating means includes a plate-shaped unit located inside the cooking pot and in direct contact with at least one food item in the plurality of food items.

17. The cooking pot according to claim 12, wherein the connection unit includes a connection control means having either reading means or indication means, which reading means is arranged to read information related to the connection means to which the connection unit is connected, whereby the connection control means also has connection accept means arranged to allow energy supply only when said information meets a matching criterion and prevent energy supply if that matching criterion is not met, and whereby the indication means is arranged to be readable by the connection means to which the connection unit is connected.

18. The cooking pot according to claim 12, wherein the cooking pot includes switching means arranged to be governed by the control unit of the cooking apparatus.

19. A cooking device, comprising:
a cooking apparatus including a control unit with a conductor means arranged to be connected to an electrical energy supply, wherein the control unit is provided with a plurality of electrical connection means; and
a plurality of interchangeable freestanding cooking pots, each cooking pot including an electrical heating means arranged to supply heat to a food item in the cooking pot and an electrical connection unit;
wherein each of the electrical connection means of the cooking apparatus is interchangeably connectable to an electrical connection unit of each cooking pot for supplying electric energy to a respective cooking pot,
wherein the control unit is arranged to allow a simultaneous supply of electric energy through said plurality of electrical connection means,
wherein the control unit is arranged to govern a switching means related to each electrical connection means,
wherein the control unit is centrally arranged relative to the plurality of cooking pots,
wherein each of the interchangeable freestanding cooking pots is only connected to the control unit through the electrical connection means,
wherein the control unit is a separate component relative to each of the plurality of cooking pots, and
wherein the control unit is disposed between the plurality of cooking pots and the electrical energy supply, such that electric energy flows from the electrical energy supply to the control unit and selectively to each electrically connected cooking pot.

20. The cooking device according to claim 19, wherein each cooking pot includes a sensing means for sensing at least one parameter related to the food item, and an information delivery means arranged to deliver information of the sensed at least one parameter to the control unit.

* * * * *